United States Patent
Lai

(10) Patent No.: US 8,599,541 B2
(45) Date of Patent: Dec. 3, 2013

(54) ELECTRONIC APPARATUS

(75) Inventor: Chien-Hua Lai, Taipei (TW)

(73) Assignee: Inventec Corporation, Taipei (TW)

( * ) Notice: Subject to any disclaimer, the term of this patent is extended or adjusted under 35 U.S.C. 154(b) by 219 days.

(21) Appl. No.: 12/976,147

(22) Filed: Dec. 22, 2010

(65) Prior Publication Data
US 2012/0127644 A1 May 24, 2012

(30) Foreign Application Priority Data
Nov. 19, 2010 (TW) ................................ 99222536 U

(51) Int. Cl.
*G06F 1/16* (2006.01)
(52) U.S. Cl.
USPC ...... 361/679.02; 361/800; 361/801; 361/802; 361/803; 361/807
(58) Field of Classification Search
USPC ...................... 361/679.02, 800–803, 807–810
See application file for complete search history.

(56) References Cited

U.S. PATENT DOCUMENTS
4,602,351 A * 7/1986 Shimamura et al. ............ 365/52

FOREIGN PATENT DOCUMENTS
TW 534499 5/2003
TW M275558 9/2005
TW M349593 1/2009

* cited by examiner

*Primary Examiner* — Jayprakash N Gandhi
*Assistant Examiner* — Hung Dang
(74) *Attorney, Agent, or Firm* — WPAT, PC; Justin King

(57) ABSTRACT

An electronic apparatus includes a casing, a cap, and an access module. An accommodation space of the casing is used for accommodating a data storage apparatus, and the access module is disposed inside the accommodation space. The casing is formed with an opening at a position corresponding to an access unit, so that an external card is inserted in or pulled out through the opening. A terminal of the access module is pivoted on the casing. The cap is used for covering and thus sealing the accommodation space, so that the access module is arranged between the data storage apparatus and the cap. Thereby, the space is saved, and the access module and the data storage apparatus can be detached or assembled conveniently.

9 Claims, 5 Drawing Sheets

ELECTRONIC APPARATUS

BACKGROUND OF THE INVENTION

1. Field of Invention

The utility model relates to a structural design of an electronic apparatus, and in particular, to an electronic apparatus which facilitates the assembly of an access module of an external card, and saves the space to further reduce the cost.

2. Related Art

Since a microprocessor and a memory chip are disposed in an external card (Smartcard), the external card is capable of storing, processing, authenticating, and identifying information, and has high confidentiality and security, thus being ever-increasingly popular in usage. For example, an electronic wallet, an IC financial card or credit card, and even a SIM card are all common external cards.

Meanwhile, the notebook computer, developed up to the present, not only becomes lighter, thinner, shorter, and smaller, but is also highly involved in the life and work of the user. No matter for work, leisure, or recreation, the notebook computer is an indispensable tool of the user, and thus, adding an access unit for the external card in the notebook computer is a trend at present.

For example, in ROC Patent No. 534499 entitled "SMARTCARD ADAPTER", the overall size and external interface of the adapter are designed as an interface in accordance with a PCMCIA standard, and a Smartcard reader module is disposed in the Smartcard adapter; in this manner, the adapter can be directly plugged into a PCMCIA slot of the notebook computer, and an opening is formed at an outward side of the adapter for the Smartcard to insert in, thus achieving an effect of connecting the Smartcard.

However, since the current design of the appearance of the notebook computer is toward the light, thin, short, and small trend, the PCMCIA interface is no longer a standard configuration, and the notebook computer configured with the PCMCIA interface is rare, so that the connection of the Smartcard through the PCMCIA interface apparently does not follow the trend.

In addition, ROC Patent No. M275558 entitled "ELECTRONIC CARD CONNECTOR" discloses an electronic card connector installed on a hard disk support, in which a terminal of an element for accommodating an electronic card is disposed on a side of the hard disk support, and is electrically connected to a circuit board. Thereby, a soft circuit board can be omitted to reduce the manufacturing cost.

However, in the design of the "ELECTRONIC CARD CONNECTOR", the electronic card connector is integrally disposed on the hard disk support, resulting in inconvenience of the maintenance, detachment, and assembly of the hard disk.

Therefore, it is necessary to improve the structure of the module for equipping the external card (Smartcard) on the notebook computer.

SUMMARY OF THE INVENTION

Accordingly, the utility model is directed to an electronic apparatus to solve the above problems, in which an access module is pivoted on a casing of the electronic apparatus, and the access module is disposed between a data storage apparatus and a cap, so as to achieve the effect that the access unit and the data storage apparatus are easily assembled and the space is saved.

To achieve the above objective, the electronic apparatus of the utility model includes a casing, a cap, and an access module. The casing has at least one accommodation space for accommodating a data storage apparatus. The access module is disposed in the accommodation space, and the casing is formed with an opening at a position corresponding to an access unit, so that an external card is inserted in or pulled out through the opening. A terminal of the access module is pivoted on the casing. The cap is used for covering and sealing the accommodation space, so that the access module is disposed between the data storage apparatus and the cap.

Since the terminal of the access module of the utility model is pivoted on the casing, and the access module is disposed between the data storage apparatus and the cap, the space is saved, and the access module and the data storage apparatus can be detached or assembled conveniently.

The detailed features and advantages of the present invention are described below in great detail through the following embodiments, and the content of the detailed description is sufficient for those skilled in the art to understand the technical content of the present invention and to implement the present invention accordingly. Based upon the content of the specification, the claims, and the drawings, those skilled in the art can easily understand the relevant objectives and advantages of the present invention.

BRIEF DESCRIPTION OF THE DRAWINGS

The present invention will become more fully understood from the detailed description given herein below for illustration only, and thus are not limitative of the present invention, and wherein.

DETAILED DESCRIPTION OF THE INVENTION

The preferred embodiment of the utility model is illustrated in detail below with reference to the accompanying drawings.

Figure 1:
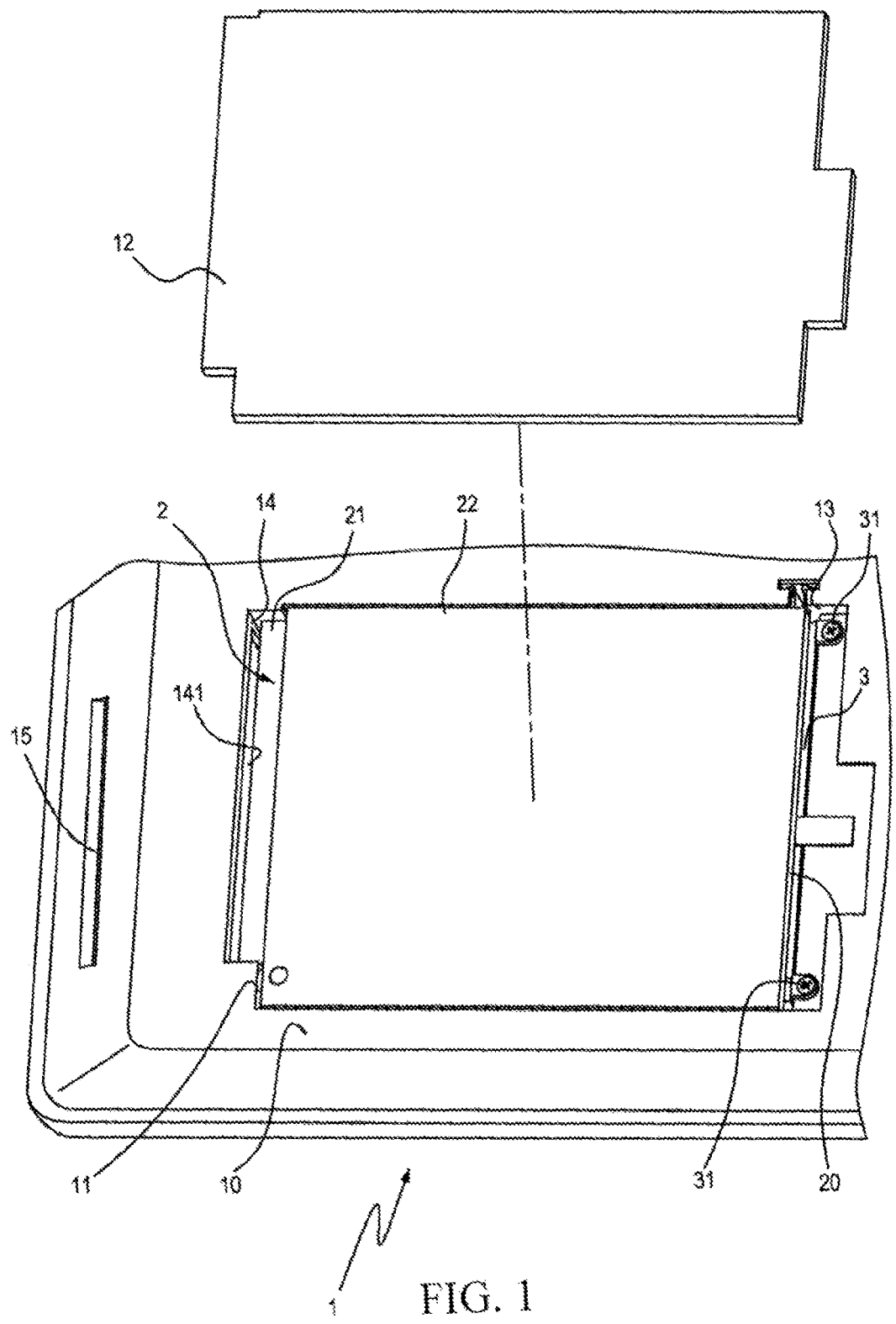
FIG. 1 is a three-dimensional outside view of the utility model.
Figure 2:
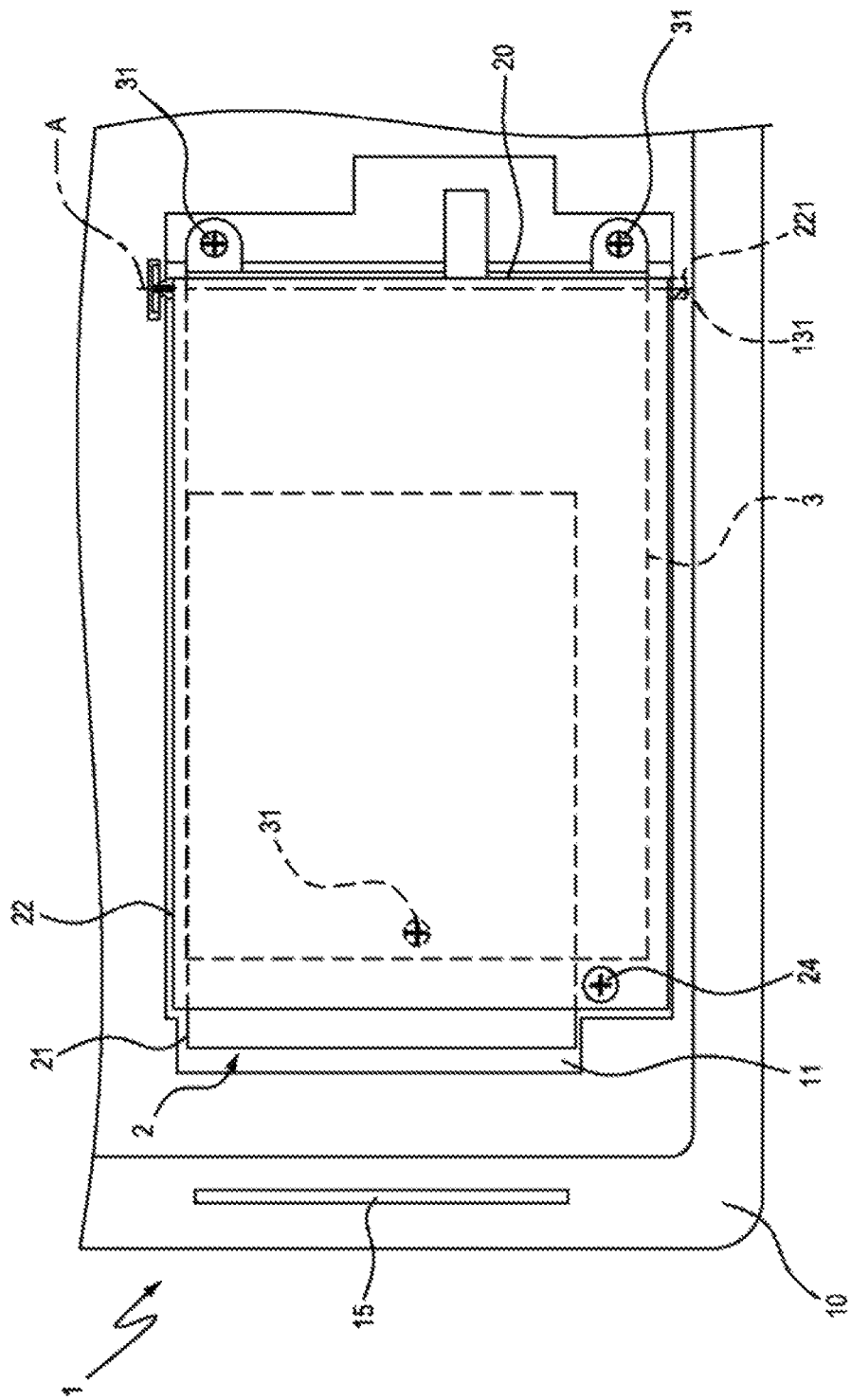
FIG. 2 is a schematic top view of the structure of the utility model.
Figure 3:
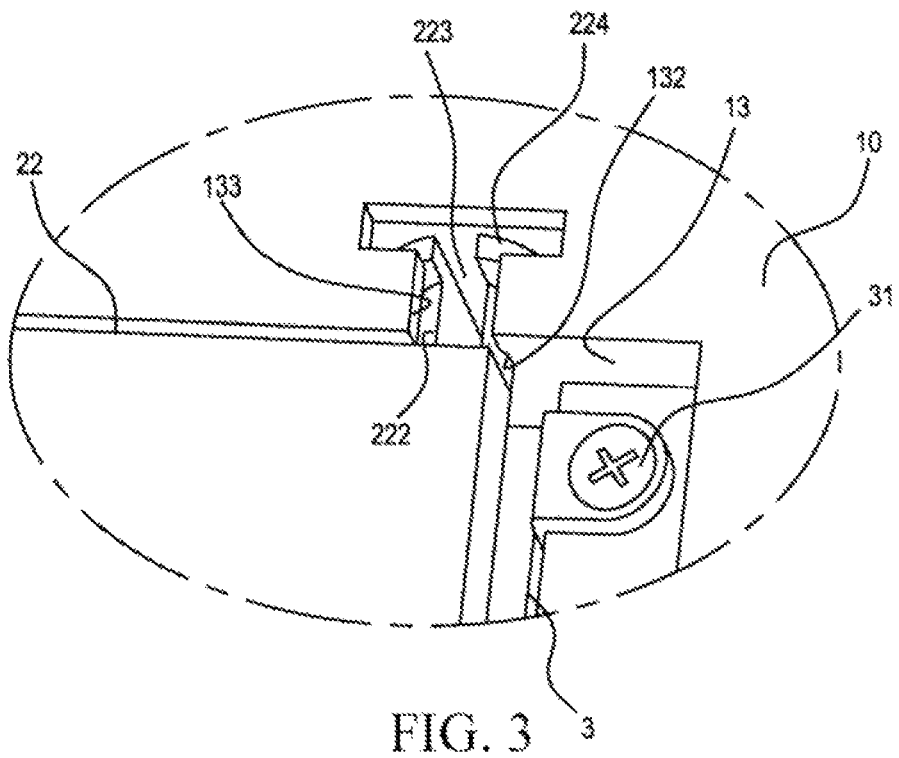
FIG. 3 is a partial enlarged view of an access module and a second pivot hole of the utility model.
Figure 4:
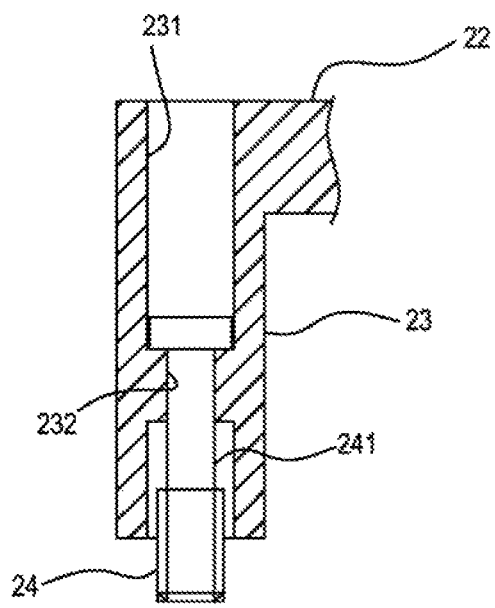
FIG. 4 is a schematic sectional view of the structure of a fixing member embedded in a fixing portion of the utility model.
Figure 5:
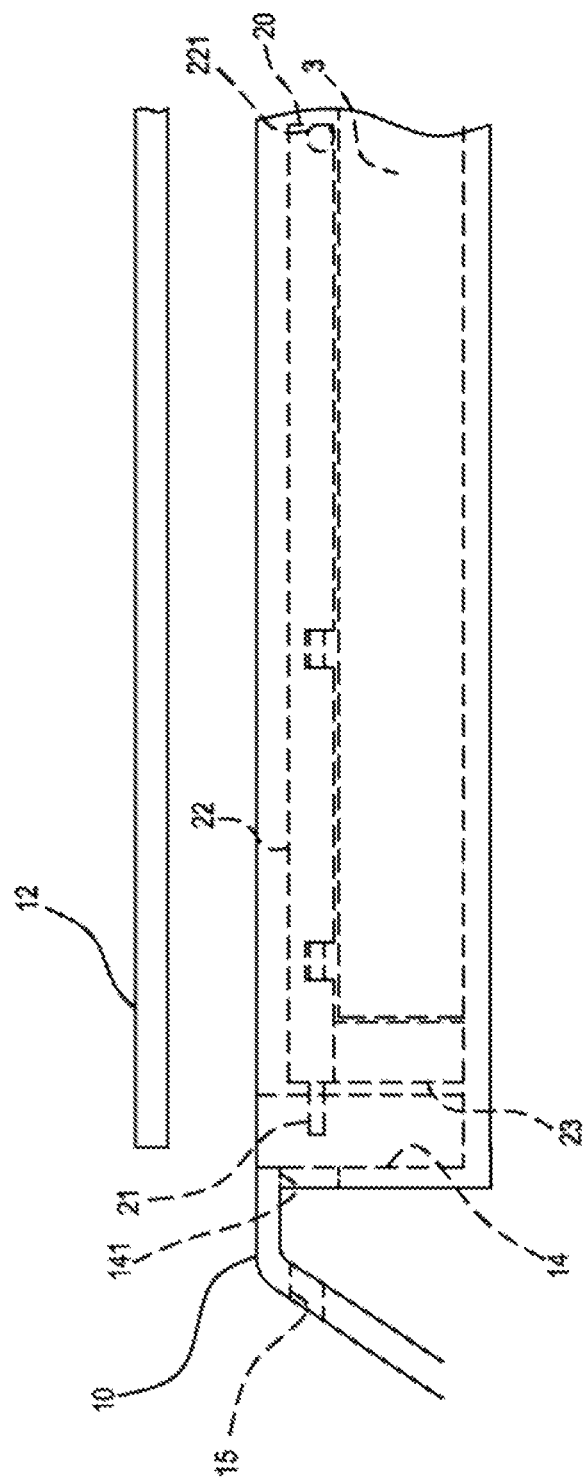
FIG. 5 is a schematic side view of the structure of the utility model.

Referring to FIG. 1 to FIG. 5, FIG. 1 is a three-dimensional outside view of the utility model; FIG. 2 is a schematic top view of the structure of the utility model; FIG. 3 is a partial enlarged view of an access module and a second pivot hole of the utility model; FIG. 4 is a schematic sectional view of the structure of a fixing member embedded in a fixing portion of the utility model; and FIG. 5 is a schematic side view of the structure of the utility model.

The electronic apparatus 1 of the utility model has a casing 10. The casing 10 has at least one accommodation space 11 for accommodating a data storage apparatus 3. A cap 12 corresponding to the accommodation space 11 is disposed in the casing 10 for sealing the accommodation space 11. An access module 2 is accommodated in the accommodation space 11 at a position close to the cap 12. A terminal 20 of the access module is pivoted on the casing 10 about an axial line A, so that the access module 2 is disposed between the data storage apparatus 3 and the cap 12, and is rotatable along a rotation direction S (referring to FIG. 6).

In this embodiment, a notebook computer is taken as an example to illustrate the electronic apparatus 1, the accommodation space 11 is mainly used for accommodating the data storage apparatus 3, and the data storage apparatus 3 is locked in the accommodation space 11 through three screws 31.

The access module 2 includes a base 22 pivoted on the casing 10 and an access unit 21 disposed on the base 22. The access unit 21 is for an external card (Smartcard) to be inserted in or pulled out and for reading and writing data, and the base 22 is pivoted in the accommodation space 11.

The casing 10 includes two first walls 13 corresponding to the accommodation space 11 and a second wall 14 connecting the two first walls 13, the second wall 14 is close to and generally parallel to one side of the casing 10, an internal opening 141 is formed on the second wall 14 corresponding to the access unit 21, and an opening 15 is formed in the casing corresponding to the access unit 21.

A first pivot hole 131 and a second pivot hole 132 are respectively disposed at positions of the two first walls 13 corresponding to the base 22. The base 22 includes a first pivot shaft 221 and a second pivot shaft 222 respectively corresponding to the first pivot hole 131 and the second pivot hole 132, so that the base 22 is pivoted between the two first walls 13.

The first pivot shaft 221 shapes like a cylinder, and the first pivot hole 131 matches with the first pivot shaft 221 to shape like a circular hole. The second pivot shaft 222 slightly shapes like a cylinder and has an opening slot 223 extending in an axial direction. A terminal of the second pivot shaft 222 away from the base 22 includes a stopper 224 extending in a radial direction. The second pivot hole 132 has a sliding slot 133 corresponding to the second pivot shaft 222. The sliding slot 133 penetrates to a side connecting the cap 12 through the second pivot hole 132, so that the second pivot shaft 222 enters the second pivot hole 132 through the sliding slot 133, and the stopper 224 holds back displacement in the axial direction.

The base 22 has at least one fixing portion 23 at a section away from the pivot. The fixing portion 23 shapes like a hollow cylinder and has a through hole 231, the through hole 231 has a small diameter portion 232, and a fixing member 24 is embedded in the through hole 231, in which the fixing member 24 is a bolt as an example for illustration in this embodiment. The fixing member 24 has a small diameter section 241 corresponding to and matching with the small diameter portion 232, so that the fixing member 24 is embedded in the fixing portion 23, and the base 22 is locked to the casing 10 through the fixing member 24.

When the access module 2 of the utility model is installed, the access unit 21 is fixed on the base 22 first, the first pivot shaft 221 of the base 22 is then inserted in the first pivot hole 131, the second pivot shaft 222 is aligned with the sliding slot 133 of the second pivot hole 132, and the second pivot shaft 222 is pushed towards the top of the second pivot hole 132. Since the second pivot shaft 222 has an opening slot 223, the second pivot shaft 222 is pressed and retracts, so as to enter the second pivot hole 132 through the sliding slot 133, and the base 22 is enabled to pivotally rotate along the rotation direction S about the axial line A formed by the first pivot shaft 221 and the second pivot shaft 222. The access module 2 is capped on the data storage apparatus 3, and is rotatably locked to the casing 10 through the fixing member 24 (bolt) embedded in the fixing portion 23, so that the base 22 is fixed in the accommodation space 11. Finally, the cap 12 seals the accommodation space 11, and thus the assembly is completed.

Figure 6:
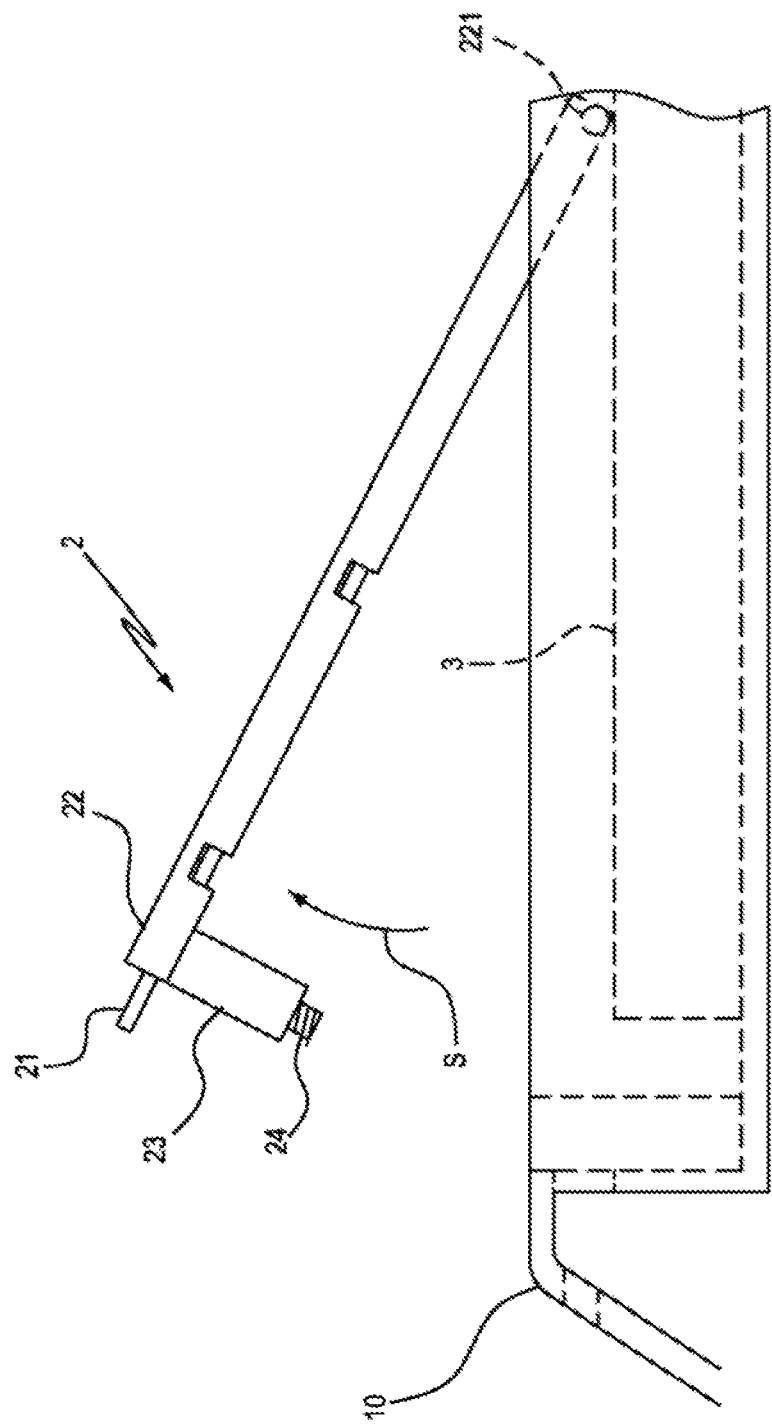
FIG. 6 is a schematic view of a using status of the utility model.

When the data storage apparatus 3 needs to be repaired or replaced, the cap is removed first, the fixing member 24 is unscrewed, and the base 22 is enabled to pivotally rotate along the rotation direction S about the axial line A to be lifted, the state of which is shown in FIG. 6, so that the maintenance personnel can detach the data storage apparatus 3. After the data storage apparatus 3 is installed, the base 22 is again enabled to pivotally rotate to make the access module 2 capped on the data storage apparatus 3, the state of which is shown in FIG. 5, and rotatably locked to the casing 10 through the fixing member 24 (bolt) embedded in the fixing portion 23. Finally, the cap seals the accommodation space, and the work is completed.

Since the access unit 21 is fixed on the base 22, the fixing member 24 is embedded in the fixing portion 23, and the base 22 is pivoted between the two first walls 13, during the detachment/assembly of the data storage apparatus 3, components of the access module 2 may not get lost, and the access module 2 can be detached or assembled through one fixing member 24, so that the detachment and assembly of the access module 2 and the data storage apparatus 3 are quite convenient.

Furthermore, the access module 2 is disposed in the accommodation space 11 between the data storage apparatus 3 and the cap 11, thus achieving the effect of saving the space to reduce the cost.

The above descriptions are merely preferred embodiments of technical solutions employed in the utility model to solve the problem, and are not intended to limit the scope of the utility model. All equivalent replacements or modifications conforming to the claims of the utility model, or made according to the claims of the utility model shall fall within the scope of the utility model.

The utility model being thus described, it will be obvious that the same may be varied in many ways. Such variations are not to be regarded as a departure from the spirit and scope of the utility model, and all such modifications as would be obvious to one skilled in the art are intended to be included within the scope of the following claims.

What is claimed is:

1. An electronic apparatus, comprising:
    a casing, having at least one accommodation space, wherein the accommodation space is used for accommodating a data access apparatus;
    an access module, disposed in the accommodation space, wherein the casing is formed with an opening at a position corresponding to an access unit, so that an external card is inserted in or pulled out through the opening, and an end of the access module is pivoted on the casing; and
    a cap, for covering and sealing the accommodation space, wherein the access module is disposed between the data access apparatus and the cap;
    wherein two corresponding sides of the accommodation space respectively have a first wall, the access module is pivoted on the first wall, a pivot hole is respectively disposed at a corresponding position of each first wall, and the access module has a pivot shaft corresponding to each pivot hole, so that the access module is pivoted between the two side walls.

2. The electronic apparatus according to claim 1, wherein the access module comprises a base pivoted on the casing and the access unit disposed on the base, and the access unit is for the external card to be inserted in or pulled out and for reading and writing data.

3. The electronic apparatus according to claim 1, wherein two pivot shafts of the base are respectively defined as a first pivot shaft and a second pivot shaft; the pivot holes corresponding to the first pivot shaft and the second pivot shaft are respectively defined as a first pivot hole and a second pivot hole; the first pivot shaft shapes like a cylinder and the first pivot hole matches with the first pivot shaft to shape like a circular hole; the second pivot shaft slightly shapes like a cylinder and has an opening slot extending in an axial direction; a terminal of the second pivot shaft away from the base has a stopper extending in a radial direction; the second pivot hole has a sliding slot corresponding to the second pivot shaft; and the sliding slot penetrates to a side connecting the cap through the second pivot hole, so that the second pivot shaft enters the second pivot hole through the sliding slot, and the stopper holds back displacement in the axial direction.

4. The electronic apparatus according to claim 2, wherein the base comprises at least one fixing portion at a section away from the pivot, and a fixing member is embedded in the fixing portion, so as to be combined and fixed on the casing.

5. The electronic apparatus according to claim 4, wherein the fixing member is a bolt.

6. The electronic apparatus according to claim 4, wherein the fixing portion shapes like a hollow cylinder, so that the fixing member is embedded therein.

7. The electronic apparatus according to claim 5, wherein the fixing portion comprises a through hole, the through hole has a small diameter portion, and the bolt has a small diameter section corresponding to and matching with the small diameter portion, so that the bolt is embedded in the fixing portion.

8. The electronic apparatus according to claim 1, wherein a second wall connecting the two first walls is disposed in the casing, the second wall is close to and generally parallel to one side of the casing, and an internal opening is formed in the second wall corresponding to the access unit.

9. The electronic apparatus according to claim 1, wherein the access module is pivoted on the casing about an axial line, and is rotatable along a rotation direction.

* * * * *